(12) United States Patent
Trimper et al.

(10) Patent No.: US 8,601,524 B2
(45) Date of Patent: Dec. 3, 2013

(54) SYSTEM AND METHOD FOR DELIVERING LONG-TAIL CONTENT

(75) Inventors: John K. Trimper, Groton, MA (US); Michael P. Ruffini, Methuen, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 785 days.

(21) Appl. No.: 11/942,277

(22) Filed: Nov. 19, 2007

(65) Prior Publication Data
US 2009/0133086 A1    May 21, 2009

(51) Int. Cl.
*H04N 7/173*    (2011.01)
(52) U.S. Cl.
USPC .............................. 725/116; 725/93; 709/219
(58) Field of Classification Search
USPC .............................. 725/86–120; 709/217–232
See application file for complete search history.

(56) References Cited

U.S. PATENT DOCUMENTS

| | | | |
|---|---|---|---|
| 5,956,716 A * | 9/1999 | Kenner et al. | 1/1 |
| 5,978,381 A * | 11/1999 | Perlman et al. | 370/432 |
| 6,240,555 B1 * | 5/2001 | Shoff et al. | 725/110 |
| 6,421,733 B1 * | 7/2002 | Tso et al. | 709/246 |
| 6,452,923 B1 * | 9/2002 | Gerszberg et al. | 370/352 |
| 7,926,079 B2 * | 4/2011 | Lebar | 725/90 |
| 2002/0154892 A1 * | 10/2002 | Hoshen et al. | 386/87 |
| 2003/0188321 A1 * | 10/2003 | Shoff et al. | 725/135 |

* cited by examiner

*Primary Examiner* — Annan Shang

(57) ABSTRACT

A system and method for delivering a long-tail content comprising a set-top box configured to couple an external signal to a user device. The long-tail content server also comprises a long-tail content server configured to provide the external signal to the set-top box from a central server. The long-tail content server further comprises a long-tail content asset manager configured to control a communication between at least one of the central server, the long-tail content server and the set-top box and at least one of the central server, the long-tail content server and the set-top box.

19 Claims, 4 Drawing Sheets

SYSTEM AND METHOD FOR DELIVERING LONG-TAIL CONTENT

BACKGROUND INFORMATION

Televisions are popular with consumers. Because of advances in recent technology, television-watching has evolved into a multimedia experience. For example, consumers may now watch TV in high-definition on a large flat-screen with stereo surround sound in the comfort of their homes. Also, consumers may select to view from an ever increasing variety of TV content catered specifically to the preferences of each consumer. Consumers may select from an electronic on-screen program guide to find and watch desired programs without bulky paper-bound guides. However, TV service providers may provide limited TV content to consumers due to the limited broadcasting capacity of the existing infrastructure. Content providers try to offer a service line-up that consists of the most popular programming, following an engineering principle that 20% of the content made available is watched by 80% of the consumer base. The less-traditional programming, or less frequently viewed programming, also known as long-tail content is eliminated from the broadcasting lineup. Many service providers are now making long-tail content available to consumers using 3 primary methods of distribution. The first method is switched digital broadcast (SDB), which is deployed in traditional QAM environments; the second method is to make long-tail content available through a different portal such as an on-demand interface. This is usually done in non real-time, where the content is loaded onto an on-demand system long after the content has been broadcast; the third method is to use IP multicast to deliver long-tail content to consumers. In all of these service models, the consumer may view the long-tail content only when the consumer subscribes to long-tail content service. As a result, the traditional long-tail content broadcasting system may be burdensome to consumers by requiring consumers to tune to a different portal/channel to receive the long-tail content. Also, the traditional long-tail content broadcasting system may be limited by the broadcasting capacity of the existing infrastructure, requiring the service provider to deploy switched digital equipment or an IP multicast support infrastructure. This system provides the ability to deliver long-tail content using IP unicast as a delivery method.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Figure 1:
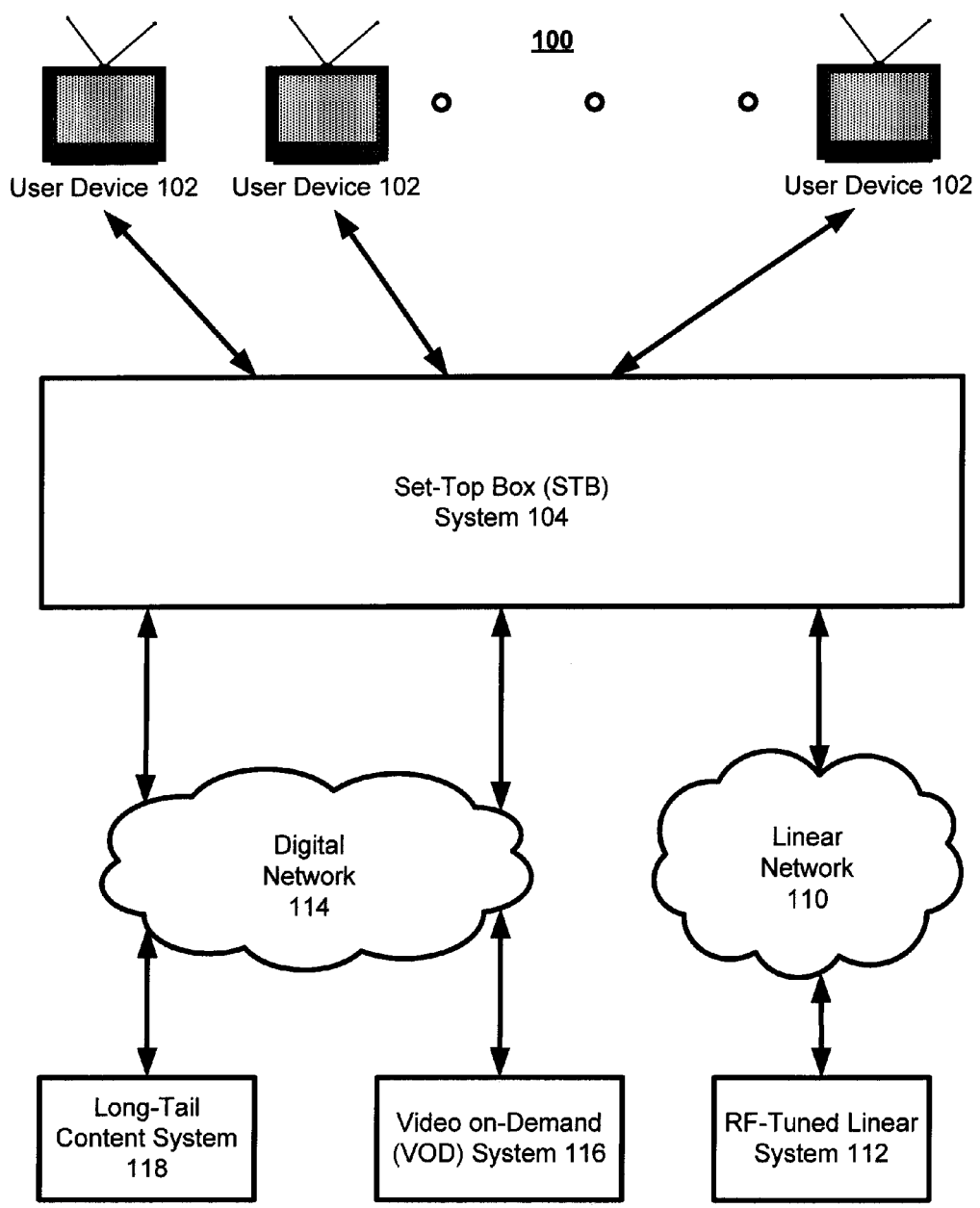
FIG. 1 depicts an exemplary system for delivering long-tail content over an Internet protocol (IP) network to a viewer, according to an exemplary embodiment.

An exemplary embodiment provides a delivery system and process for delivering long-tail content to one or more viewers. The long-tail content delivering system may deliver the long-tail content to one or more viewers via a unicast over an Internet protocol (IP) network. For example, the long-tail content delivery system may be integrated or otherwise associated with a central server located at a provider site. Also, the long-tail content delivery system may be in communication with the central server located at the provider site through a network, such as a wireless network and/or a wired network. Advantageously, the long-tail content delivery system may deliver long-tail content to a viewer without the viewer entering a separate portal. Additionally, the long-tail content delivery system may enable a service provider to provide long-tail content on the existing broadcasting infrastructure, such as Internet protocol (IP) unicast.

An exemplary long-tail content delivery system may be coupled, integrated and/or associated with a central server located at a provider site. For example, the long-tail content delivery system may enable a real-time streaming protocol (RTSP) transmission of long-tail content to one or more viewers. Thus, the viewers may tune to long-tail content similar to radio frequency (RF)-tuned linear content. Also, the long-tail content delivery system may be supported by an Internet protocol (IP) network. Radio frequency (RF)-tuned linear content and Internet Protocol (IP) based content (e.g., video on-demand content and/or long-tail content) may be provided on disparate transmission paths. Further, the long-tail content delivery system may enable a service provider to provide more content to the one or more viewers compared to the existing long-tail content delivery system. The long-tail content delivery system provides a mechanism for service providers to offer a more programming than what the traditional broadcast mechanisms allow.

The description below describes a long-tail content system, a long-tail content server, a long-tail content asset manager, a long-tail content client, a programming guide and other elements for delivering long-tail content that may include one or more modules, some of which are explicitly depicted, others of which are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, computers, etc.) separately. The functions described as being performed at various components may be performed at other components, and the various components may be combined and/or separated. Other modifications also may be made.

FIG. 1 is a system 100 for delivering long-tail content to one or more viewers, according to an exemplary embodiment. As illustrated, one or more user devices 102 may be coupled to a set-top box (STB) system 104. The set-top box (STB) system 104 may be coupled to a radio frequency (RF)-tuned linear system 112 via a linear network 110. Also, the set-top box (STB) system 104 may be coupled to a video on-demand (VOD) system 116 and/or a long-tail content system 118 via a digital network 114. Linear network 110 and digital network 114 may be shown as disparate network, however, one having ordinary skill in the art would appreciate that linear network 110 and digital network 114 may be a single network. The long-tail content system 100 may deliver long-tail content to one or more viewers via the user device 102. The one or more viewers may provide a request to the set-top box (STB) system 104. For example, the one or more viewers may request radio frequency (RF)-tuned linear content. The set-top box (STB) system 104 may provide the request to the radio frequency (RF)-tuned linear system 112 via the linear network 110. The radio frequency (RF)-tuned linear system 112 may transfer the requested content to the set-top box (STB) system 104 via the linear network 110. The set-top box (STB) system 104 may provide the requested content to the user device 102 and displayed to the one or more viewers.

Also for example, the one or more viewers may select on-demand content and/or a channel associated with the video on-demand content via the user device 102. The one or more viewers may provide a request for the video on-demand content to the set-top box (STB) system 104. The set-top box (STB) system 104 may provide the request for the video on-demand content to the video on-demand (VOD) system 116 via the digital network 114. The video on-demand system 116 may provide the requested video on-demand content to the set-top box (STB) system 104 via the digital network 114. The set-top box (STB) system 104 may provide the requested video on-demand content to the user device 102 and may be displayed to the one or more viewers.

In addition, the one or more viewers may select long-tail content information and/or a channel associated with the long-tail content via the user device 102. The one or more viewers may provide a request for long-tail content to the set-top box (STB) system 104. The set-top box (STB) system 104 may provide the request for the long-tail content to the long-tail content system 118 via the digital network 114. The long-tail content system 118 may provide the requested long-tail content to the set-top box (STB) system 104 via the digital network 114. The set-top box (STB) system 104 may provide the requested long-tail content to the user device 102 and displayed to the one or more viewers.

The user device 102 may display radio frequency (RF)-tuned linear content, video on-demand content and/or long-tail content. The user device 102 may be a television set, for example. The user device 102 also may be other devices capable for displaying video, such as, but not limited to, computer monitor, liquid crystal display (LCD), cathode ray tube (CRT), rear projection television (RPTV), flat panel television, plasma display, surface-conduction electron-emitter display (SED), video projector, light-emitting diode, organic light-emitting diode (OLED) and/or other similar display devices for displaying television content.

The set-top box (STB) system 104 may be coupled to, integrated and/or associated with the user device 102. The set-top box (STB) system 104 may be a digital video recorder, a set top box, a converter, or other device capable of coupling an external signal source to the user device 102. The set-top box (STB) system 104 may couple an external signal source from an Ethernet cable, a satellite dish, a coaxial cable, a telephone line, a broadband over power line, a very high frequency antenna, ultra high frequency antenna and/or other external signal source to transmit a signal to the user device 102. The set-top box (STB) system 104 and the user device 102 also may be a single device, instead of two separate devices, as shown.

Linear network 110 may be a wireless network, a wired network or any combination of wireless network and wired network. The linear network 110 may be a communication network for deliver content and enable communication between the radio frequency (RF)-tuned linear system 112 with the set-top box (STB) system 104. For example, the linear network 110 may include, without limitation, wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or other wireless network which may deliver content and communicate radio frequency (RF)-tuned linear system 112 and the set-top box (STB) system 104. In addition, linear network 110 may include, without limitation, telephone line, fiber optics, IEEE Ethernet 802.3, wide area network (WAN), local area network (LAN), global network such as the Internet. Also, linear network 110 may enable, a wireless communication network, a cellular network, an Intranet, or the like, or any combination thereof. The linear network 110 may further include one, or any number of the exemplary types of networks mentioned above operating as a stand-alone network or in cooperation with each other.

Digital network 114 may be a wireless network, a wired network or any combination of wireless network and wired network. The digital network 114 may be a communication network to enable an Internet protocol (IP) content (e.g., video on-demand content and/or long-tail content) having real-time streaming protocol (RTSP) capabilities. For example, the digital network 114 may include, without limitation, telephone line, fiber optics, IEEE Ethernet 802.3, wide area network (WAN), local area network (LAN), global network such as the Internet. Also, the digital network 114 may include, without limitation, wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or other wireless network for deliver content and enable communication between the video on-demand (VOD) system 116 and the long-tail content system 118 with the set-top box (STB) system 104. In addition, digital network 114 may enable, a wireless communication network, a cellular network, an Intranet, or the like, or any combination thereof. The digital network 114 may further include one, or any number of the exemplary types of networks mentioned above operating as a stand-alone network or in cooperation with each other.

Figure 2:
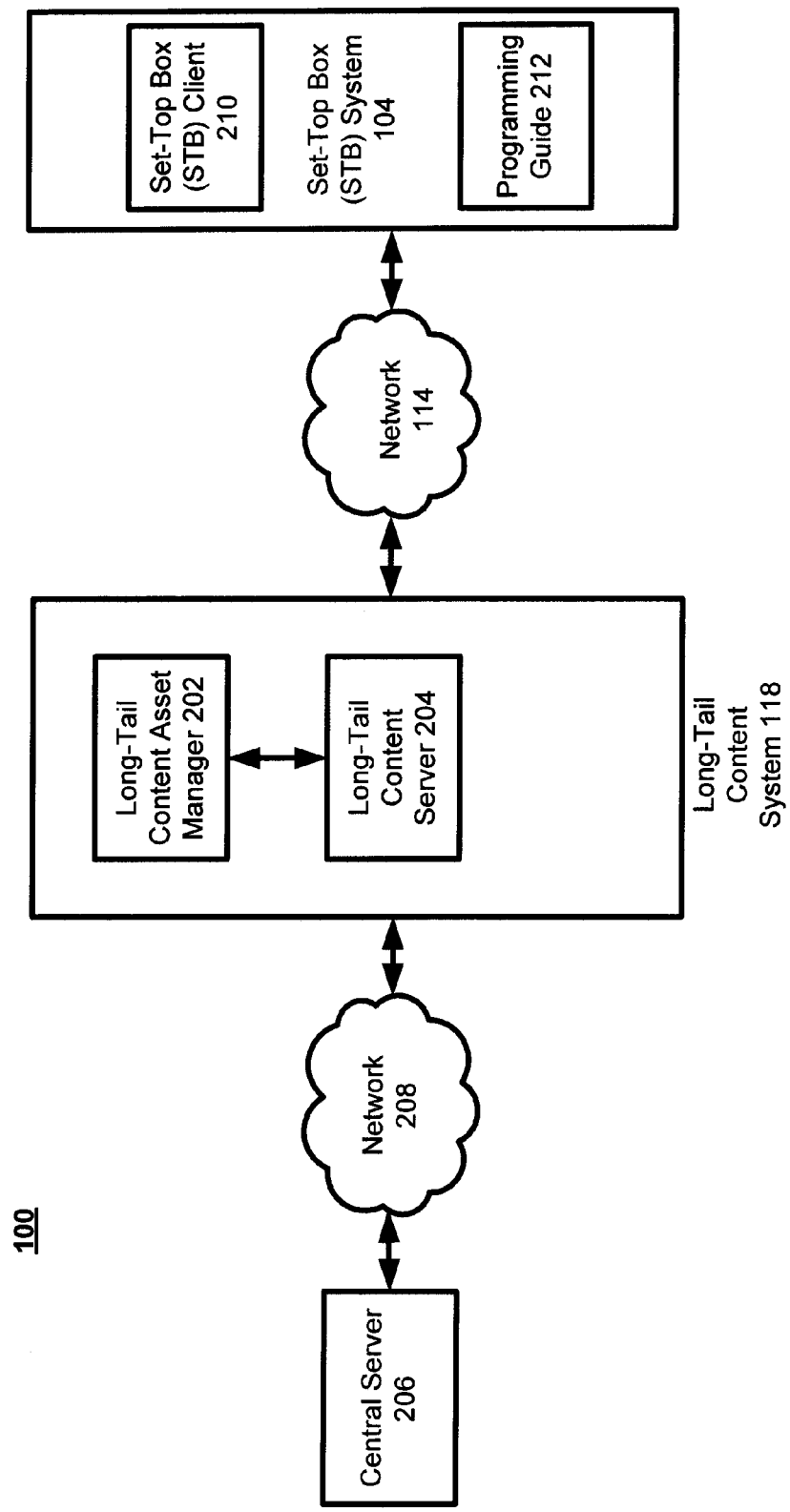
FIG. 2 depicts an exemplary system for delivering long-tail content via a long-tail content system, according to an exemplary embodiment.

FIG. 2 illustrates a partial detailed view of the long-tail content delivery system 100 for delivering long-tail content to one or more viewers, according to an exemplary embodiment. As discussed above, the long-tail content system 118 may be communicatively coupled to the set-top box (STB) system 104 via the digital network 114. As illustrated, the set-top box (STB) system 104 may include a set-top box (STB) client 210 and/or a programming guide 212. Also, the long-tail content system 118 may be coupled to a central server 206 via network 208. The long-tail content system 118 may include a long-tail content asset manager 202 and/or a long-tail content server 204.

The central server 206 may provide long-tail content to the long-tail content server 204 via network 208. The long-tail content may be content that may not be watched frequently by the one or more viewers. For example, the central server 206 may provide five food cooking content (e.g., five cooking television programs), three of the five food cooking content may be frequently watched provided to the radio frequency (RF)-tuned linear system 112. The two less frequently watched food cooking contents may be sent to the long-tail content server 204.

The long-tail content server 204 may provide the long-tail content to the one or more viewers via the set-top box (STB) system 104. For example, one or more viewers may request a less frequently watched food cooking program and the long-tail content server 204 may provide the requested food cooking program to the one or more viewers. Also, the long-tail content server 204 may replicate the long-tail content and provide copies of the replicated long-tail content to the one or more viewers. For example, one or more viewers may request a less frequently watched cooking program and the long-tail content server 204 may replicate two or more copies of the less frequently watched cooking program and may provide the two or more copies of the less frequently watched cooking program to the set-top box (STB) system 104 associated with the one or more viewers.

Further, the long-tail content server 204 may buffer long-tail content for a predetermined amount of time. For example, one or more viewers may request long-tail content and the long-tail content may be filmed (e.g., taping of a show and/or live direct feed of a show) at a different time zone than the requesting one or more viewers. In addition, the long-tail content server 204 may delay the availability of the long-tail content to the requesting viewers. The delay of the availability of the long-tail content may depend on the time difference between the filming location of the long-tail content and the requesting one or more viewers and/or a predetermined viewing time of the long-tail content in accordance with the programming guide 212. For example, the long-tail content may be filmed at London which may be five or six hours ahead of a requesting viewer located in the eastern standard time (EST) zone. The long-tail content server 204 may store the long-tail content for five or six hours to synchronize the broadcasting time between London time and the eastern standard time (EST). Furthermore, the long-tail content server 204 may store the long-tail content for a predetermined amount of time. For example, long-tail content may be stored in the long-tail content server 204 for twelve hours, twenty-four hours or a week where one or more viewers may request the long-tail content multiple times. In addition, the long-tail content server 204 may archive a long-tail content for record keeping. For example, the long-tail content server 204 may provide permanent storage of the long-tail content for record keeping.

Moreover, the long-tail content server 204 may provide live feed of the long-tail content to the one or more viewers. For example, the one or more viewers may request the live feed of the long-tail content and the long-tail content server 204 may provide the long-tail content to the one or more requesting viewers. Also, no viewers may request the live feed of the long-tail content and the live feed of the long-tail content may be deleted and/or not stored.

The long-tail content asset manager 202 may determine a mapping associated with the long-tail content provided by the central server 206 to the long-tail content server 204. The long-tail content asset manager 202 may be a computer readable media including code to control a function of the long-tail content system 118, the set-top box (STB) client 210 and/or the programming guide 212. The long-tail content asset manager 202 may associate a channel and/or a time slot with long-tail content. For example, the long-tail content asset manager 202 may associate channel 800 at 7 p.m. to 8 p.m. to a food cooking program. Also, the long-tail content asset manager 202 may be in communication with the programming guide 212, The mapping information associated with the long-tail content may be provided to the programming guide 212 by the long-tail content asset manager 202 to be displayed to the one or more viewers.

In addition, the long-tail content asset manager 202 may associate identification information associated with the long-tail content. For example, the long-tail content asset manager 202 may associate a uniform resource locator to the long-tail content. Also, the long-tail content asset manager 202 may associate a content name, content time and/or other identification information for identifying long-tail content.

Further, the long-tail content asset manager 202 may determine a storage time, buffer time and/or live feed associated with the long-tail content. The long-tail content asset manager 202 may determine a storage time associated with the long-tail content and/or an archive time of the long-tail content. Also, the long-tail content asset manager 202 may determine a time delay and/or a buffer time associated with long-tail content. Further, the long-tail content asset manager 202 may determine a live feed associated with the long-tail content. Furthermore, the long-tail content asset manager 202 may determine a reception associated with a long-tail content from the central server 202 to the long-tail content server 204. For example, the long-tail content asset manager 202 may determine a storage time and/or a buffer time of a long-tail content upon reception of such long-tail content.

Moreover, the long-tail content asset manager 202 may receive a request for long-tail content from one or more viewers from the set-top box (STB) system 104. The long-tail content asset manager 202 may provide the viewer's request from the set-top box (STB) system 104 to the long-tail content server 204. For example, one or more viewers may request long-tail content, the long-tail content asset manager 202 may provide the viewer's request to the long-tail content server 204. Also, the long-tail content asset manager 202 may access the long-tail content server 204 based at least in part on the viewer's request. The long-tail content asset manager 202 may further determine a transmission associated with long-tail content from the long-tail content server 204 to one or more viewers based at least in part on the viewer's request. For example, the long-tail content asset manager 202 may determine the transmission path, bandwidth, frequency, carrier wave and/or other transmission characteristics associated with the transmission of the long-tail content to the one or more viewers.

In addition, the long-tail content asset manager 202 may receive a request for long-tail content from the set-top box (STB) client 210. The long-tail content asset manager 202 may transmit information associated with the requested long-tail content to the set-top box (STB) client 210. The set-top box (STB) client 210 may provide the information associated with the requested long-tail content to the long-tail content server 204.

The set-top box (STB) system 104 may be an integrated receiver/decoder (IRD) device and/or a small computer that may couple the user display device 102 to the long-tail content system 118. The set-top box (STB) system 104 may receive an external signal and couple the external signal to the one or more viewers via the user device 102.

The set-top box (STB) system 104 may tune (e.g., a channel) to the radio frequency (RF)-tuned linear system 112, the Video on-Demand (VOD) system 116 and/or the long-tail content system 118. For example, one or more viewers may tune to the radio frequency (RF)-tuned linear system 112 on the set-top box (STB) system 104 where frequently viewed content may be offered, for example, National Broadcasting Company (NBC), Fox Broadcasting Company (FOX), American Broadcasting Company (ABC), Columbia Broadcasting System (CBS) and/or other frequently viewed contents. Also, one or more viewers may tune to the video on-demand (VOD) system 116 and start a video on-demand (VOD) session. For example, one or more viewers may request a movie and/or a television program from a video on-demand session (e.g., Finding Nemo and/or a sporting event). The video on-demand (VOD) system 116 may provide the requested movie and/or television program to the one or more viewers.

Further, the set-top box (STB) system 104 may verify the requested content is long-tail content. For example, the set-top box (STB) system 104 may receive a content request from one or more viewers. The one or more viewers requested content may be associated with a channel and/or a time slot. The set-top box (STB) system 104 may determine the viewer request content is a radio frequency (RF)-tuned linear content, a video on-demand content or a long-tail content based at least in part on the channel and/or the time slot associated with the viewer requested content. The set-top box (STB) system 104 may determine that the viewer requested content is long-tail content. The set-top box (STB) system 104 may transfer the request to the set-top box (STB) client 210. The set-top box (STB) client 210 may be contained in the set-top box (STB) system 104 and may initiate a long-tail content session over the digital network 114 (e.g., Internet protocol (IP) network). The set-top box (STB) client 210 may provide the request for the long-tail content to the long-tail content asset manager 202. The long-tail content asset manager 202 may provide information associated with the requested long-tail content to the set-top box (STB) client 210. The set-top box (STB) client 210 may provide information associated with the requested long-tail content to the long-tail content server 204. The long-tail content server 204 may provide the requested long-tail content based at least in part on information associated with the long-tail content to the set-top box (STB) client 210. The information associated with the long-tail content may include, a mapping of the long-tail content, storage location of the long-tail content, transmission channel, frequency, bandwidth and/or modulation of the long-tail content and/or other information associated with the identification and/or transmission of the long-tail content.

Figure 3:
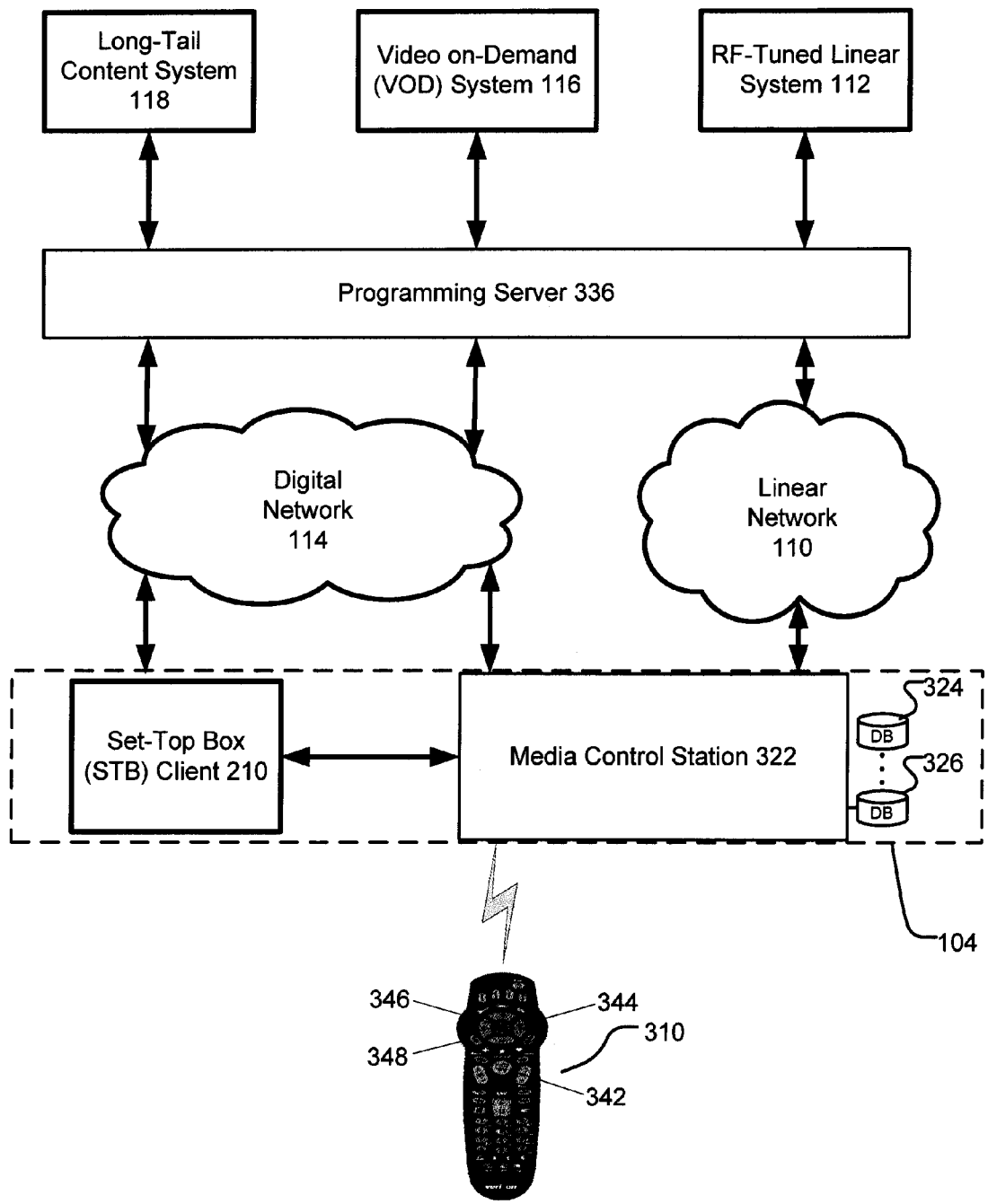
FIG. 3 depicts a detailed exemplary system for providing a programming guide, according to an exemplary embodiment.

One or more viewers may obtain the channel information, time slot information and/or other content information associated with the long-tail content from the programming guide 212 assigned by the long tail content asset manager 202. FIG. 3 depicts a detailed block diagram of the long-tail content delivery system 100 to support a programming guide 212, according to an exemplary embodiment. The programming guide 212 may comprise a remote control device 310 and the set-top box (STB) system 104. The set-top box (STB) system 104 may further include a media control station 322 and one or more databases 324, 326. The media control station 322 may include a receiver to receive one or more commands/signals from the remote control device 310 and/or receive one or more media signals (e.g., streaming media, television programs) from the radio frequency (RF)-tuned linear system 112 and/or the video on-demand system 116. The set-top box (STB) client 210 may receive one or more command/signals from the media control station 322 and/or transmit/receive one or more medial signals (e.g., a long-tail content) from the long-tail content system 118. A programming server 336 may be coupled between the radio frequency (RF)-tuned linear system 112, video on-demand (VOD) system 116 and the long-tail content system 118 and the set-top box (STB) system 104. The programming server 336 may comprise a Log Collecting Module, a Metrics and Profile Module, and/or a Content Recommendation Module (not shown). It will be appreciated that the variations and components may also be provided, such as a Content Information Server (e.g., from which content/information may be fetched), a viewer interface, additional inputs/outputs, etc.

Although each of the Log Collecting Module, the Metrics and Profile Module and the Content Recommendation Module may be one module, it should be appreciated that the contents of the each of these module may be combined into fewer or greater numbers of modules (or server-like devices, such as modules) and may be connected to one or more data storage systems. Furthermore, each of these modules may be local, remote, or a combination thereof to the set-top box (STB) system 104. Other various embodiments may also be provided. In addition, it should be appreciated that while a telephone line is not depicted in any of the figures, one of ordinary skill in the art would recognize that telephone lines may be utilized for transmitting data and/or information between the various components.

The remote control device 310 may transmit and/or receive signals to/from the set-top box (STB) system 104. The remote control device 310 may include, for example, a display graphical user interface command 342, one or more navigation commands 344, a selection command 346, and an exit command 348. The exit command 348 may communicate a termination identifier to exit out of a display of a graphical user interface, the display graphical user interface command 342 may instruct the set-top box (STB) system 104 to cause the display of a graphical user interface, the one or more navigation commands 344 may be arrows for scrolling through and highlighting various fields of a graphical user interface, and the selection command 346 may select a particular field within the graphical user interface. It is noted that the remote control device 310 is depicted as being a remote control with keys that may be pressed by a user. The remote control device 310 also may include a touchscreen where the viewer may touch an icon on a display (e.g., on user device 102). Other input devices also may be used, such as, but not limited to, voice activated or gesture activated input devices.

Signal transmission by the remote control device 310 may include a variety of wireless signaling pathways, such as infrared, Bluetooth™, local area wireless network (e.g., 802.11 based protocols), and/or other similar signaling applications for communication between the remote control device 310 and the set-top box (STB) system 104 or other similar devices. Other various embodiments may also be provided.

It should be appreciated by one of ordinary skill in the art that the remote control device 310 may come in a variety of shapes, sizes, textures, and functionalities with an assortment of buttons and/or labels. Additionally, the remote control device 310 may use various technologies (e.g., wired or wireless technologies) to communicate with external devices. Furthermore, the remote control device 310 may include various playback features, alphanumeric entries/buttons, and other similar functions. It should also be appreciated that other devices having alphanumeric and/or similar remote control capabilities may be used as remote control devices as well. These may include desktop computers, laptops, game controllers, mobile communication devices, such as personal digital assistants (PDAs), mobile phones, smart phones, as well as other devices that may transmit and/or receive signals to/from the set-top box (STB) system 104.

Databases 324, 326 may store relevant information received from the radio frequency (RF)-tuned linear system 112, the video on-demand system 116, the long-tail content system 118 and/or the programming server 336. Exemplary database information may include network provider information, TV program channel numbers, TV program channel names, program listings, program schedules for each of the programs, future and past program content information, ratings, viewer preferences, advertisement categories, advertisers, advertised product/service, and/or other information provided by one or more viewers or the radio frequency (RF)-tuned linear system 112, the video on-demand system 116, the long-tail content system 118 or storage source (e.g., pre-recorded TV programs/movies). Although shown as two separate databases, it should be appreciated that the contents of these databases may be combined into fewer or greater numbers of databases and may be stored on one or more data storage systems and/or servers. Furthermore, the databases 324, 326 may be local, remote, or a combination thereof to the set-top box (STB) system 104. Additionally, the databases 324, 326 may also store relevant information for personalized subscriber services. These may include user/viewer channel preferences, preferred TV programs/channels, preferred TV viewing times, and other preferred or customized information. Such information may be useful in providing additional customizations for enhanced TV-viewing experience. Other variations may also be provided.

Log Collecting Module (not shown) may include one or more processors for recording and storing data and/or information from one or more viewers through the set-top box (STB) system 104. The data and/or information may be stored and indexed in one or more databases by the one or more processors of the Log Collecting Module. In this example, the stored data and/or information may include, but is not limited to, a viewer's viewing habits and/or preferences, e.g., preferred TV programs/channels, consistency in viewing various TV programs/channels, time of day these are viewed, duration of viewing, frequency of channel-changing from or to various programs/channels, types of channels/programs viewed, etc. In another exemplary embodiment, the stored data and/or information may also include paid content (e.g., Video on Demand and/or Pay-per-view), shows that are recorded using a personal video recorder (PVR) or other similar device (e.g., a digital video recorder (DVR), or other media (e.g., Internet videos, music, etc.).

In one embodiment, the Log Collecting Module may utilize processor logic to identify the desired data and/or information to be recorded and stored. In another embodiment, the Log Collecting Module may record and store the data and/or information based on a viewer's manual input of habits and/or preferences. In yet another embodiment, the Log Collecting Module may include additional processing logic to sort and index the one or more recorded and stored data/information.

Storing and indexing the data/information may further allow the processing logic to cross-reference the various data/information for forming new categories or personal customizations. For example, in one embodiment, this may include complex viewing patterns/habits, such as how a viewer searches for programs to view (e.g., use of channel scanning, EPG, or search function). In another embodiment, this may include identifying commonalities in programs/channels viewed, such as type, genre, channel, or programs created or performed by a particular entity (e.g., a particular actor/actress, director, producer, sports team, etc.). In yet another embodiment, this may include frequency of recording programs/channels or use of PVR/DVR (Personal Video Recorder/Digital Video Recorder) features. In yet another embodiment, further processing may be utilized to determine when the programs/channels relating to these categories are viewed at various times of the day or week. Other various embodiments may also be provided.

Metrics and Profile Module (not shown) may include one or more processors for storing and retrieving data and/or information from the Log Collecting Module. The data and/or information may be stored and indexed in one or more databases by the one or more processors of the Metrics and Profile Module. In this example, the Metrics and Profile Module may utilize processor logic to create, store, and retrieve viewer data and/or information based on profiles corresponding to various users/viewers. Here, a profile may include a collection of various user preferences. Since user preferences may be stored in profiles, similarities and differences between various users may be more readily discerned. Other various profile embodiments may also be utilized. In one embodiment, the Metrics and Profile Module may interact with the Log Collecting Module and/or the Content Recommendation Module to store, update, and disseminate viewer profiles. In another embodiment, the Metrics and Profile Module may interact with other servers, such as marketing servers (not shown), to generate usage reports on the various profiles and profile types. In yet another embodiment, the Metrics and Profile Module may further allow the processing logic to cross-reference the various data/information to compare various viewer profiles and form new categories based on various degrees of similarity. Other various embodiments may also be provided.

Content Recommendation Module (not shown) may include one or more processors (not shown) for presenting data and/or information to one or more viewers through the set-top box (STB) system 104. The data and/or information may be stored and indexed in one or more databases (not shown) by the one or more processors of the Content Recommendation Module. In this example, the Content Recommendation Module may present one or more viewers with personal content recommendations based on the viewer's personal viewing history, which may be retrieved from data and/or information stored at the Log Collecting Module. These personal viewer recommendations may include a viewer's preferred TV programs/channels based on consistency in viewing various TV programs/channels, time of day these are viewed, duration of viewing, frequency of channel-changing from or to various programs/channels, types of channels/programs viewed, consumer popularity, etc. In another embodiment, a viewer's personal content recommendations may be based on the preferences, viewing history, habits of other users/profiles exhibiting similar patterns to the one or more viewers. In this example, these profiles may be retrieved from the Metrics and Profile Module and presented by the Content Recommendation Module to the one or more viewers. Other various embodiments may also be provided.

By monitoring or tracking a viewers actions and TV-navigation history, recording the habits and preferences along the way, storing them, and/or indexing them into various categories and profiles, as discussed above, viewer recommendations for TV content may be provided. Not only does this provide an effective and improved technique for navigating various programs/shows, it also provides users the ability to do so in an efficient manner. As a result, overall TV-watching experience may be further enhanced because one or more viewers may spend less time navigating programs/shows and spend more time enjoying their preferred programs/shows. Moreover, providing personal content recommendations may maximize advertisement and marketing opportunities by linking advertisements with the preferences of viewers, which may not otherwise be provided by conventional electronic programming guides (EPGs) or other navigation techniques. Accordingly, embodiments may expand the limited number of techniques for searching and navigating one or more shows/programs using various program guide menus and options.

Figure 4:
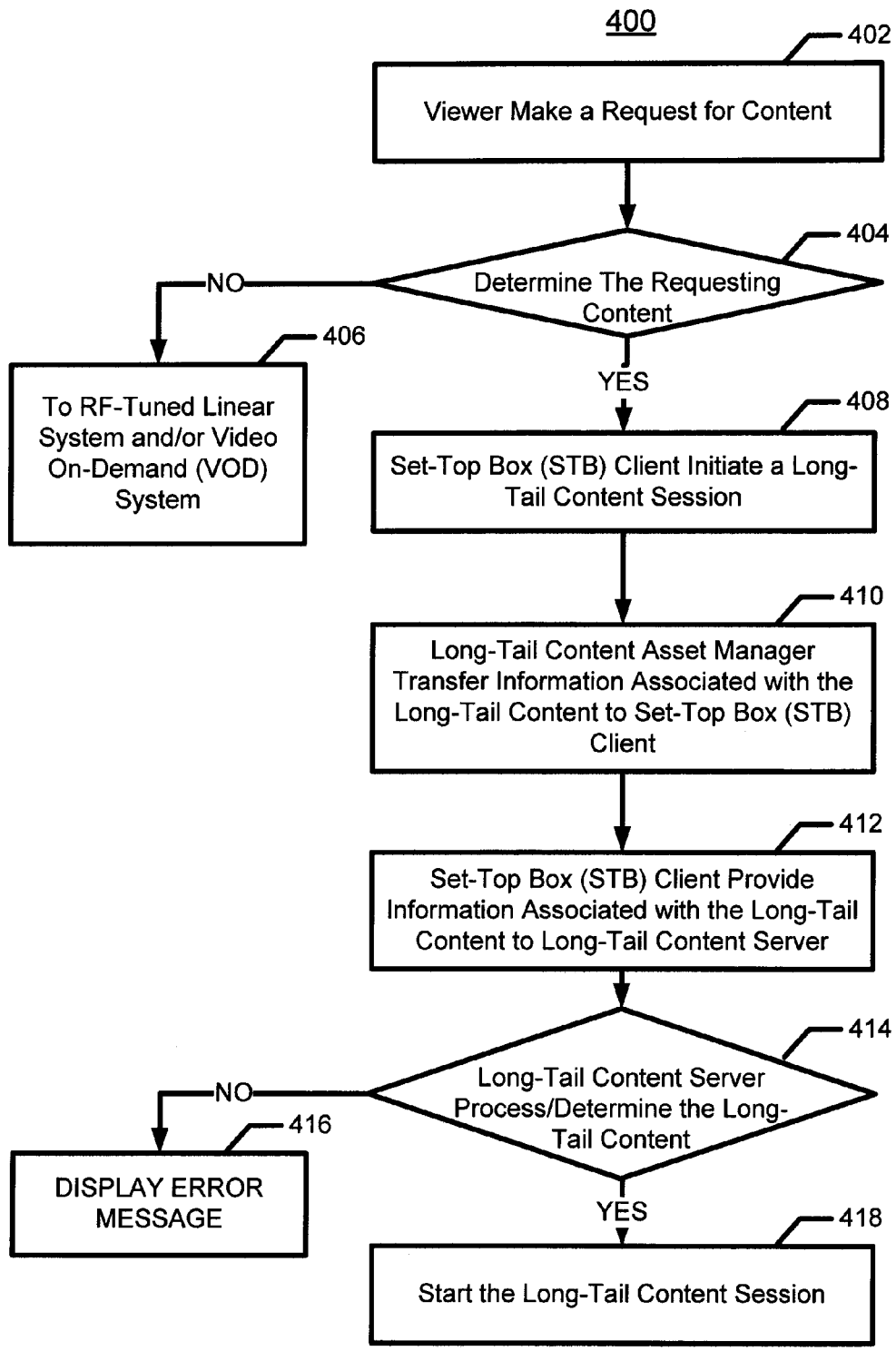
FIG. 4 depicts a flowchart of a method for providing long-tail content over an Internet protocol (IP) network, according to an exemplary embodiment.

FIG. 4 illustrates a flow diagram of a method 400 for delivering long-tail content to one or more viewers, in accordance with exemplary embodiment. This exemplary method 400 may be provided by way of example, as there are a variety of ways to carry out the method. The method 400 shown in FIG. 4 can be executed or otherwise performed by one or a combination of various systems. The method 400 is described below may be carried out by the long-tail content delivery system 100 shown in FIGS. 1, 2 and 3, by way of example, and various elements of the delivery system 100 are referenced in explaining the example method of FIG. 4. Each block shown in FIG. 4 represents one or more processes, methods or subroutines carried out in exemplary method 400. Referring to FIG. 4, exemplary method 400 may begin at block 402.

At block 402, one or more viewers may utilize a remote control device 310 to make a request for radio frequency (RF)-tuned linear content, video on-demand (VOD) content and/or long-tail content. For example, a programming guide 212 may provide the one or more viewers a channel and/or time slot associated with the content. Also, the programming guide 212 may provide the one or more viewers a brief description of the content and/or other information associated with identifying the content. The one or more viewers may utilize the remote control device 310 to provide a request signal associated with identification information of the content to a set-top box (STB) system 104. Further, one or more viewers may input a request for content via an input module (not shown e.g., keypad) associated with the set-top box (STB) system 104. After the one or more viewers makes a request for content, the method 400 may proceed to block 404.

At block 404, the set-top box (STB) system 104 may determine whether one or more viewers is requesting radio frequency (RF)-tuned linear content, video on-demand (VOD) content or long-tail content. The media control station 322 located in the set-top box (STB) system 104 may receive a request signal associated with the requested content identification information from the remote control device 310. The media control station 322 may determine whether the request for content may be associated with radio frequency (RF)-tuned linear content, video on-demand content or long-tail content. For example, the media control station 322 may determine that the one or more viewers requested radio frequency (RF)-tuned linear content or video on-demand content. After the media control station 322, determines the one or more viewers requested radio frequency (RF)-tuned linear content or video on-demand content, the method 400 may proceed to block 406. Also for example, the media control station 322 may determine that the one or more viewers requested long-tail content. After the media control station 322 determines the one or more viewers requested long-tail content, the method 400 may proceed to block 408.

At block 406, the media control station 322 may determine the one or more viewers requested radio frequency (RF)-linear content or video on-demand (VOD) content. The set-top box (STB) system 104 may provide a request for radio frequency (RF)-tuned linear to the radio frequency (RF)-tuned linear system 112 via a linear network 110 based at least in part on the request signal for radio frequency (RF)-tuned linear content. Also, the set-top box (STB) system 104 may provide a request for video on-demand content to the video on-demand system 116 via digital network 114 based at least in part on the requested signal for the video on-demand content. The radio frequency (RF)-tuned linear system 112 or the video on-demand (VOD) system 116 may provide the requested content to the set-top box (STB) system 104 to display to the one or more viewers via a user device 102.

At block 408, the set-top box (STB) client 210 may initiate a long-tail content session by providing the request to a long-tail content asset manager 202. Also, the set-top box (STB) client 210 may provide information associated with initiating a long-tail content session to the long-tail content asset manager 202. After the set-top box (STB) client 210 may initiate a long-tail content session, the method 400 may proceed to block 410.

At block 410, in response to receiving the request for long-tail content, the long-tail asset manager 202 may provide the set-top box (STB) client 210 information associated with the requested long-tail content. The media control station 322 may provide the request to the set-top box (STB) client 210. The long-tail content asset manager 202 may process the request to identify the long-tail content associated with the request. Also, the long-tail content asset manager 202 may identify and/or extract mapping information associated with the requested long-tail content. For example, the mapping information associated with the long-tail content may include a mapping of the long-tail content, storage location of the long-tail content, an identification information (e.g., uniform resource locator (URL)), transmission channel, frequency, bandwidth/modulation of the long-tail content and/or other mapping information associated with transmission/reception of the long-tail content. The long-tail content asset manager 202 may provide the mapping information associated with the requested long-tail content to the set-top box (STB) client 210. After the long-tail content asset manager 202 provide mapping information associated with the requested long-tail content, the method 400 may proceed to block 412.

At block 412, the set-top box (STB) client 210 may provide the mapping information associated with the requested long-tail content to the long-tail content server 204. Also, the set-top box (STB) client 210 may process the mapping information associated with the requested long-tail content. For example, the set-top box (STB) client 210 may format the mapping information, translate the mapping information, transform the mapping information and/or other methods for processing the mapping information associated with the long-tail content. After the set-top box (STB) client 210 may provide the mapping information associated with the requested long-tail content to the long-tail content server 204, the method 400 may proceed to block 414.

At block 414, the long-tail content server 204 may process and/or determine the long-tail content associated with the mapping information stored in the long-tail content server 204. For example, the long-tail content server 204 may detect the mapping information associated with the long-tail content. The long-tail content server 204 may utilize the mapping information associated with the long-tail content to locate a long-tail content stored in the long-tail content server 204. The long-tail content server 204 may locate the requested long-tail content. Also, the long-tail content server 204 may not locate the requested long-tail content. After the long-tail content server 204 may not locate the requested long-tail content, the method 400 may proceed to block 416.

At block 416, in response to the long-tail content server 204 not locating the requested long-tail content and may provide an error message to the set-top box (STB) client 210 to be displayed to the one or more viewers via the user device 102.

After the long-tail content server 204 locate the requested long-tail content, the method may proceed to block 418. At block 418, the long-tail content server 204 may provide the requested long-tail content to the set-top box (STB) client 210 to be displayed to the one or more viewers via the user device 102.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
   receiving a first request for content based at least in part on television channel information and timeslot information assigned to the requested content, wherein the television channel information and the timeslot information are provided by a programming guide;
   determining whether the requested content is long-tail content or non-long-tail content and providing the request to an alternate system if the requested content is non-long-tail content;
   if the requested content is long-tail content, transmitting information associated with the requested long-tail content from a long-tail content asset manager to the set-top box client;
   receiving a second request to initiate a long-tail content session based at least in part on the information associated with the long-tail content; and
   transmitting the long-tail content from a long-tail content server to the set-top box client without tuning the set-top box client to a different channel.

2. The method of claim 1, wherein the transmitting information associated with the long-tail content comprises at least one of a mapping of the long-tail content, a storage location of the long-tail content, a transmitting channel, a transmitting frequency, a transmitting bandwidth and a modulation of the long-tail content.

3. The method of claim 1, further comprising receiving the long-tail content from a central server.

4. The method of claim 3, further comprising assigning identification information associated with the long-tail content from the central server.

5. The method of claim 4, wherein the identification information associated with the long-tail content comprises a uniform resource locator.

6. The method of claim 3, further comprising buffering the long-tail content from the central server.

7. The method of claim 1, further comprising determining the second request to initiate the long-tail content session based at least in part on the information associated with the long-tail content matching an identification information associated with long-tail content stored in the long-tail content server.

8. The method of claim 1, wherein the transmitting the long-tail content from the long-tail content server to the set-top box client is via an Internet protocol network.

9. A non-transitory computer readable media comprising code to perform the acts of the method of claim 1.

10. A method, comprising:
    receiving a first request from a viewer;
    determining whether the request relates to long-tail content or non-long-tail content;
    if the request relates to long-tail content, transmitting the first request to a long-tail content asset manager;
    receiving information associated with the first request from the long-tail content asset manager;
    transmitting a second request based at least in part on the information associated with the first request from the long-tail content asset manager;
    receiving long-tail content from a long-tail content server, wherein the long-tail content server assigns television channel information and time-slot information to the long-tail content, wherein the television channel information or the time-slot information are provided by a programming guide; and
    displaying the long-tail content to the viewer with a user device without tuning the user device to a different channel.

11. The method of claim 10, further comprising determining whether the first request from the viewer comprises a request for at least one of a RF-tuned linear content, a video on-demand content and a long-tail content.

12. The method of claim 11, further comprising transmitting the first request to a radio frequency-tuned linear system.

13. The method of claim 11, further comprising transmitting the first request to a video on-demand system.

14. A non-transitory computer readable media comprising code to perform the acts of the method of claim 10.

15. A system, comprising:
    a long-tail content server configured to provide, upon receipt of a request for long-tail content, an external signal including at least one long-tail content having television channel information and time slot information to a set-top box from a central server without tuning the set-top box to a different channel, wherein the television channel information or time slot information are provided by a programming guide to aid a user in searching and navigating long-tail content; and
    a long-tail content asset manager configured to control a communication between at least one of (1) the central server and the long-tail content server and (2) the set-top box and at least one of the central server, the long-tail content server and the set-top box.

16. The system of claim 15, further comprises the set-top box configured to couple an external signal to a user device.

17. The system of claim 15, wherein the set-top box comprises a set-top box client to couple the external signal to the user device.

18. The system of claim 15, wherein the long-tail content server comprises a database configured to store the external signal from the central server.

19. The system of claim 15, wherein the programming guide comprises a database configured to store TV programs/channels or TV viewing times.

* * * * *